United States Patent
Chiang (10) Patent No.: US 9,048,044 B2
(45) Date of Patent: *Jun. 2, 2015

(54) CURSOR CONTROL DEVICE

(75) Inventor: Hsiao-Long Chiang, Taipei (TW)

(73) Assignee: Jung-Chang Hsu, New Taipei (TW)

( * ) Notice: Subject to any disclaimer, the term of this patent is extended or adjusted under 35 U.S.C. 154(b) by 1446 days.

This patent is subject to a terminal disclaimer.

(21) Appl. No.: 12/656,955

(22) Filed: Feb. 22, 2010

(65) Prior Publication Data

US 2011/0018798 A1 Jan. 27, 2011

(30) Foreign Application Priority Data

Mar. 4, 2009 (TW) .............................. 98203274 U (51) Int. Cl.
*G06F 3/033* (2013.01)
*H01H 25/00* (2006.01)
*G06F 3/0354* (2013.01)
*G06F 3/0485* (2013.01)
*G06F 3/0481* (2013.01)
*G06F 3/0362* (2013.01)
*G06F 3/03* (2006.01)
*G06F 3/042* (2006.01)
*H01H 19/14* (2006.01)

(52) U.S. Cl.
CPC ........... *H01H 25/008* (2013.01); *G06F 3/0354* (2013.01); *G06F 3/0304* (2013.01); *G06F 3/0485* (2013.01); *G06F 3/03543* (2013.01); *G06F 3/0312* (2013.01); *G06F 3/033* (2013.01); *G06F 3/042* (2013.01); *G06F 3/04812* (2013.01); *G06F 3/0362* (2013.01); *H01H 2019/146* (2013.01)

(58) Field of Classification Search
USPC .................................................. 345/157, 163
See application file for complete search history.

(56) References Cited

U.S. PATENT DOCUMENTS

| | | | | | |
|---|---|---|---|---|---|
| 4,823,634 | A | * | 4/1989 | Culver | 74/471 XY |
| 4,896,554 | A | * | 1/1990 | Culver | 74/471 XY |
| 5,126,723 | A | * | 6/1992 | Long et al. | 345/157 |
| 5,164,712 | A | * | 11/1992 | Niitsuma | 345/184 |
| 6,256,011 | B1 | * | 7/2001 | Culver | 345/157 |
| 6,337,680 | B1 | * | 1/2002 | Hamaji | 345/157 |
| 7,199,792 | B2 | * | 4/2007 | Wang | 345/184 |
| 8,184,095 | B2 | * | 5/2012 | Pan et al. | 345/156 |
| 2005/0275637 | A1 | * | 12/2005 | Hinckley et al. | 345/173 |
| 2007/0139396 | A1 | * | 6/2007 | Kanayama et al. | 345/173 |
| 2007/0176897 | A1 | * | 8/2007 | Wang | 345/157 |
| 2012/0162071 | A1 | * | 6/2012 | Nien et al. | 345/157 |

* cited by examiner

*Primary Examiner* — Linh N Hoffner
(74) *Attorney, Agent, or Firm* — Kirton McConkie; Evan R. Witt (57) ABSTRACT

A cursor control device having a low profile characteristic is disclosed to include a module holder defining an accommodation space and a slot, an operation module having a carrier frame mounted in the accommodation space and inserted through the slot, a rolling roll rotatably and axially movably set in a rotation groove on the carrier frame outside the module holder, and a circuit module having a microprocessor and a sensor module mounted in carrier frame outside the rotation groove and electrically connected with the microprocessor for detecting the direction and amount of movement of the rolling roll. The rolling roll can be directly removed from the carrier frame by the user for cleaning or for a replacement.

23 Claims, 9 Drawing Sheets

CURSOR CONTROL DEVICE

This application claims the priority benefit of Taiwan patent application number 098203274, filed on Mar. 4, 2009.

BACKGROUND OF THE INVENTION

1. Field of the Invention

The present invention relates to cursor control technology and more particularly, to a cursor control device, which uses a sensor module to detect the direction and amount of movement of a rolling roll that is rotatably mounted in a rotation groove on a carrier frame and can be removed from the carrier frame directly by the user for cleaning or for weight adjustment.

2. Description of the Related Art

Following fast development of modern technology and the electronic industry, many kinds of consumer electronics, such as computer, mobile telephone, digital camera, personal digital assistant and etc., have entered into our daily life. Further, following popularization of network, people may use the internet to search for information on the World Wide Web. Through the internet, people can watch online favorite movies, TV shows, cartoons, music videos and much more. Through the internet, people can also play web games and online games, send e-mails, go online shopping, make a subscription or online payment, or transfer money.

Further, a computer has multiple functions, bringing convenience to the user. Further, a computer may be equipped with a keyboard and/or mouse for controlling a cursor on a display screen. When operating a computer mouse, a user may rest the wrist of the hand on the desk or a mouse pad and then move the computer mouse or click the button of the computer mouse with the fingers. However, when going to move the computer mouse over a big area, the user must lift the wrist from the desk or mouse pad. Excessive or improper use of a computer may cause pain in the wrist (the so-called carpal tunnel syndrome). In order to eliminate this problem, wrist rests are created. A wrist rest is a device used to support the wrist while typing or when using a computer mouse. However, leaning the wrists on a wrist rest for long periods can put a lot of pressure on the undersides of the wrists. This may cause carpal tunnel syndrome to develop. Actually, a wrist rest does help align the user's hands and wrists while mousing. Further, an improperly used wrist rest may actually cause more repetitive stress injuries for those who mouse for extended periods of time.

Therefore, it is desirable to provide an orthopedically engineered cursor control device that eliminates the aforesaid problems.

SUMMARY OF THE INVENTION

The present invention has been accomplished under the circumstances in view. It is one object of the present invention to provide a cursor control device, which eliminates the drawbacks of the aforesaid conventional measures To achieve this and other objects of the present invention, a cursor control device is adapted for controlling a cursor on a display screen of a computer. The cursor control device comprises a module holder defining an accommodation space therein and a slot in communication with the accommodation space, an operation module, which comprises a carrier frame mounted in the accommodation space and inserted through the slot, the carrier frame having a rotation groove disposed outside the module holder and an opening located on one lateral side thereof in communication with the accommodation space, a rolling roll accommodated in the rotation groove and rotatable and axially movable relative to the carrier frame, and a circuit module, which comprises a microprocessor, a sensor module mounted in the opening of the carrier frame outside the rotation groove and electrically connected with the microprocessor and adapted for detecting the direction and amount of movement of the rolling roll. Further, the rolling roll has a length shorter than the length of the rotation groove. Therefore, when the rolling roll is covered with dust or when the user wishes to adjust the weight of the rolling roll, the user can take the rolling roll out of the carrier frame directly with the hand.

Further, the sensor module of the circuit module is mounted on the outside of the carrier frame at one lateral side corresponding to the opening of the carrier frame for detecting the direction and amount of movement of the rolling roll. It simply needs to provide a space below the carrier frame for allowing vertical movement of the carrier frame and for accommodating the balance bar. Therefore, the vertical height of the cursor control device can be minimized and, outside dust will not enter the opening to cover the sensor module, assuring a high level of sensing accuracy.

Further, a balance bar is pivotally supported on bottom support members of the carrier frame, having two end pins thereof respectively pivotally coupled to respective pivot connectors at the module holder. Therefore, the balance bar keeps the rolling roll and the carrier frame in balance for allowing the carrier frame to be moved downwards smoothly. If the carrier frame is made from a non-hard material (plastics or rubber), the balance bar will support the carrier frame in shape, keeping the carrier frame straight and allowing rotation or axial displacement of the rolling roll smoothly.

Further, the carrier frame can be prepared from POM, PTFE or any other self-lubricating material to reduce friction. Further, supplementary elements may be used to facilitate rotation of the rolling roll in the rotation groove.

Further, the rolling roll can be a solid roll. Alternatively, the rolling roll can be a tubular roll having an axial through hole extending through the two distal ends thereof for accommodating weights to adjust the total weight of the rolling roll. Further, a magnetically permeable core member may be fitted into the axial through hole of the rolling roll. Further, magnetic members may be affixed to the carrier frame to attract the magnetically permeable core member in the axial through hole of the rolling roll, securing the rolling roll to the carrier frame and avoiding falling of the rolling roll out of the carrier frame accidentally due to an excessive amount of applied force during operation of the cursor control device.

DETAILED DESCRIPTION OF THE PREFERRED EMBODIMENT

Referring to FIGS. 1~5, a cursor control device in accordance with the present invention is shown comprising a module holder 1, an operation module 2, a circuit module 3 and a rolling roll 4.

The module holder 1 comprises a first holder shell 11 and a second holder shell 12. The first holder shell 11 and the second holder shell 12 define therebetween an accommodation space 10. The first holder shell 11 has a plurality of limiters 111 disposed in the accommodation space 10 at one lateral side, a plurality of locating members 112 and pivot connectors 113 symmetrically disposed near two distal ends of the first holder shell 11 within the accommodation space 10 at the other lateral side opposite to the limiters 111, a plurality of pivot supports 114 spaced between the locating members 112 and the pivot connectors 113 and a groove 115 disposed between the limiters 111 and the pivot supports 114. The second holder shell 12 has a slot 121 cut through the top and bottom walls thereof corresponding to the limiters 111 of the first holder shell 11, two coupling holes 122 respectively disposed at the two distal ends thereof, a plurality of limiters 123 respectively disposed adjacent to the coupling holes 122, a plurality of insertion holes 124 corresponding to the pivot supports 114 and a bearing flange 125 extended from one lateral side thereof. Further, a soft or elastic wrist pad 13 is arranged onto the top side of the bearing flange 125. Further, an ornamental plate 14 is covered on the second holder shell 12 around the insertion holes 124.

The operation module 2 comprises a carrier frame 21, a balance bar 22, a plurality of knobs 23 and operation members 24. The carrier frame 21 is supported on the second holder shell 12 and partially inserted into the accommodation space 10, having a rotation groove 211 disposed outside the accommodation space 10, an opening 212 disposed adjacent to the slot 121 and in communication with the accommodation space 10, a plurality of position-limit blocks 213 respectively coupled to the limiters 111 of the first holder shell 11 of the module holder 1 for allowing the carrier frame 21 to be moved up and down relative the first holder shell 11 within a predetermined range, a plurality of elastic members 214 provided at the bottom side thereof and stopped against the first holder shell 11, a press member 215 and a plurality of bottom support members 216. The balance bar 22 has an elongated base portion 221 pivotally coupled to the bottom support members 216 of the carrier frame 21, two arm portions 222 respectively perpendicularly extended from the two distal ends of the elongated base portion 221 and respectively coupled to the locating members 112 of the first holder shell 11 of the module holder 1 and two end pins 223 respectively perpendicularly extended from the arm portions 222 remote from the elongated base portion 221 toward each other and respectively pivotally coupled to the pivot connectors 113 of the module holder 1. The knobs 23 are respectively coupled to the coupling holes 122 of the second holder shell 12 of the module holder 1, each having a pivot pin 231 pivotally connected to the first holder shell 11 of the module holder 1. The operation members 24 are respectively mounted in the module holder 1 and respectively partially exposed to the outside of the module holder 1 through the insertion holes 124 on the second holder shell 12.

The circuit module 3 comprises a microprocessor 31, a sensor module 32, a plurality of control switches 33 and a connection interface 34. The sensor module 32, the control switches 33 and the connection interface 34 are respectively electrically connected to the microprocessor 31. The sensor module 32 is mounted on the outside of the carrier frame 21 corresponding to the opening 212 and adapted to detect rotation of the rolling roll 4 in the rotation groove 211 of the carrier frame 21. The control switches 33 are respectively arranged for triggering by the press members 215, the knobs 23 and the operation members 24 to produce respective control signals. The connection interface 34 is electrically connected to a connection port 51 of a computer 5. Further, the connection interface 34 can be a USB or PS2 connector, or any other type of commercial connection interface.

The rolling roll 4 is rotatably and axially slidably mounted in the rotation groove 211 of the carrier frame 21, having a length relatively shorter than the length of the rotation groove 211.

Further, as stated above, the module holder 1 is formed of the aforesaid first holder shell 11 and second holder shell 12. Alternatively, the module holder 1 can be a single-piece member having the said accommodation space 10 and slot 121 defined therein for accommodating the operation module 2 and circuit module 3 and the carrier frame 21 that carries the rolling roll 4.

Referring to FIGS. 2, 3, 6 and 7, during the use of the present invention, the user can rest the wrists of the hands on the elastic wrist pad 13 and then use the fingers to operate the operation members 24 and the rolling roll 4, thereby moving the cursor on the display screen of the computer 5. Further, because the rolling roll 4 has a length shorter than the rotation groove 211 of the carrier frame 21, the user can move the rolling roll 4 leftwards or rightwards in the rotation groove 211. When the rolling roll 4 is moved to the left or right end of the rotation groove 211, it can be inserted into the accommodation space 10 to bias one respective knob 23 into contact with one respective control switch 33 of the circuit module 3, thereby causing the respective control switch 33 to produce a corresponding signal to move the cursor on the display screen of the computer 5 leftwards or rightwards.

Figure 1:
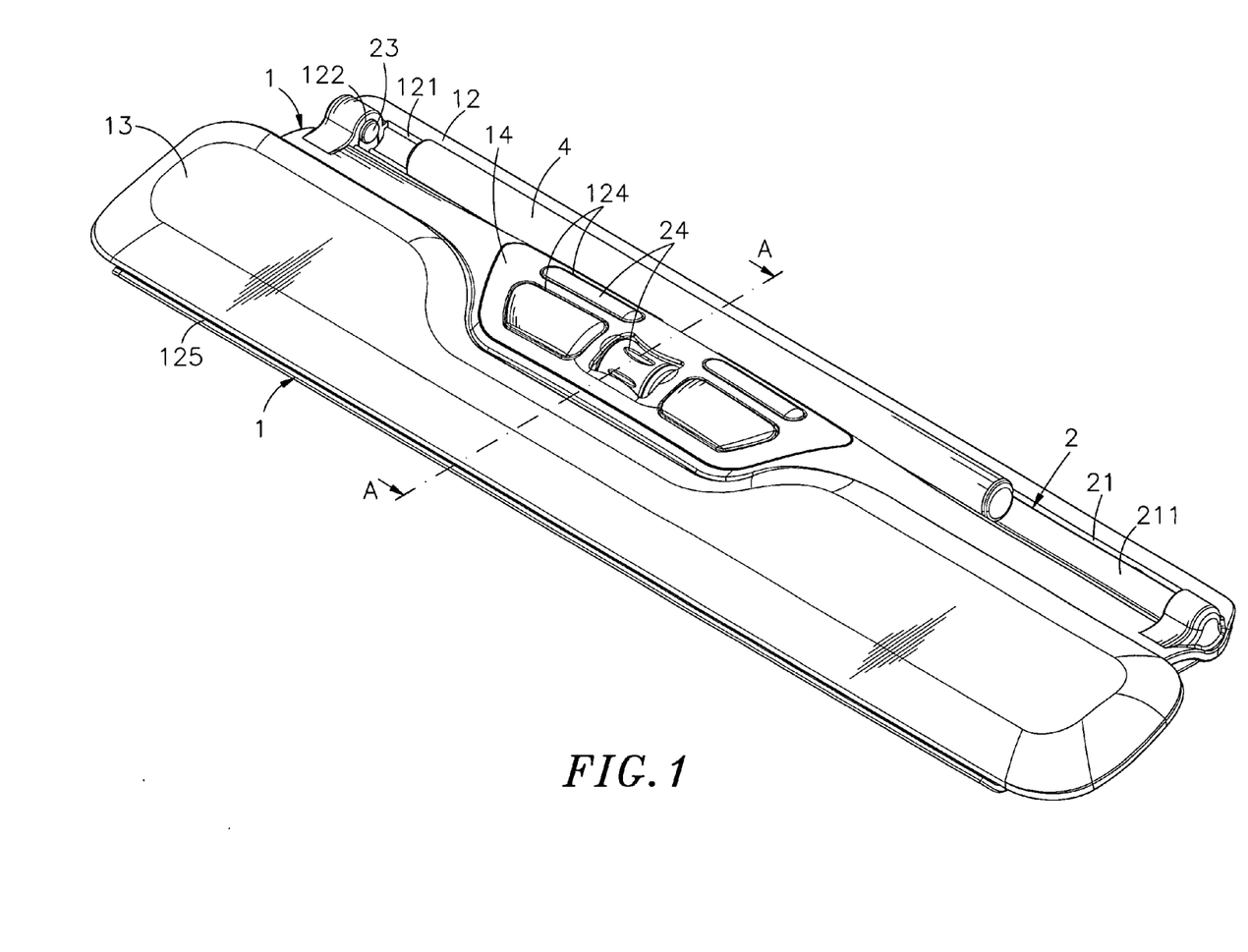
FIG. 1 is an oblique elevational view of a cursor control device in accordance with the present invention.
Figure 2:
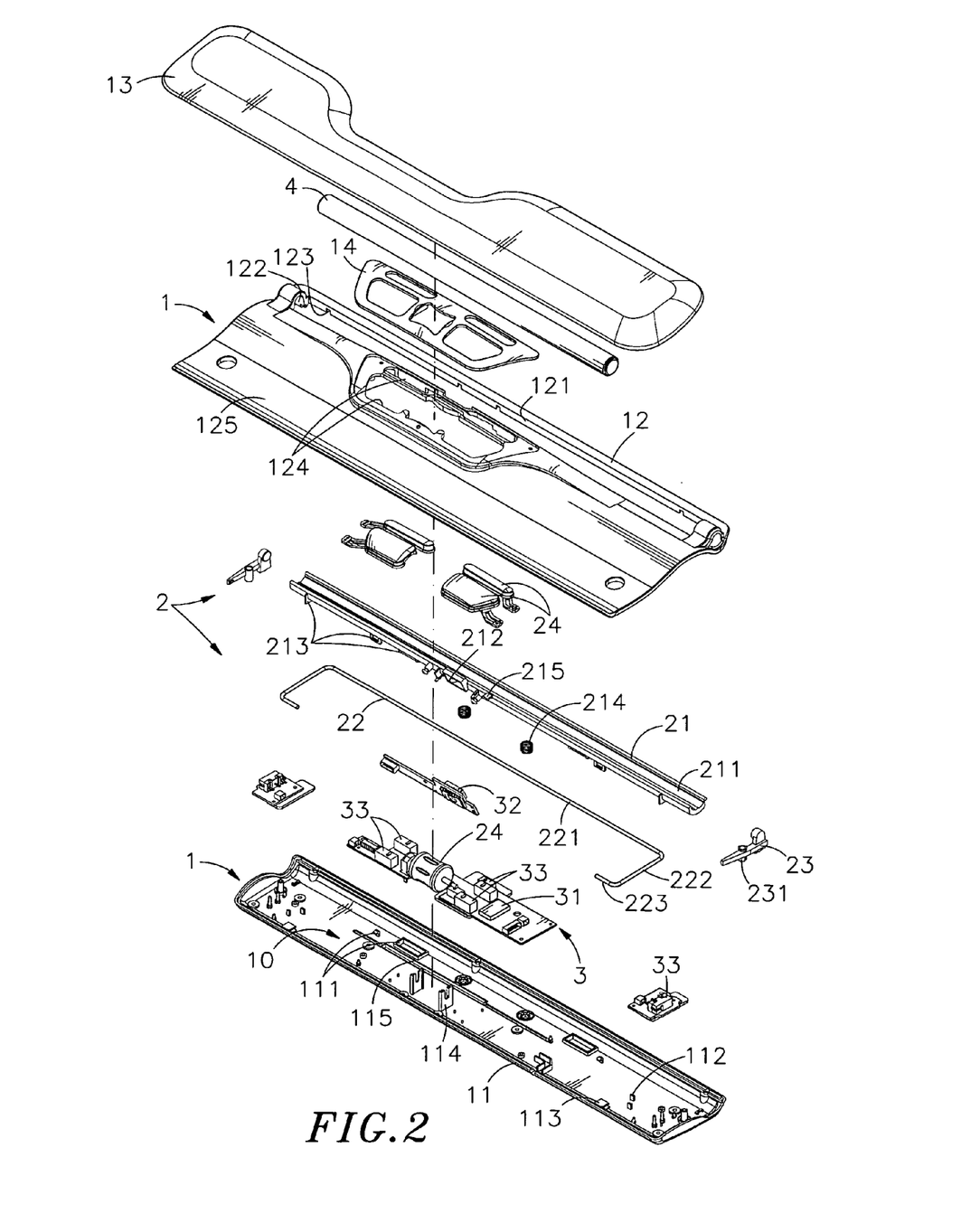
FIG. 2 is an exploded view of a part of the cursor control device in accordance with the present invention.
Figure 3:
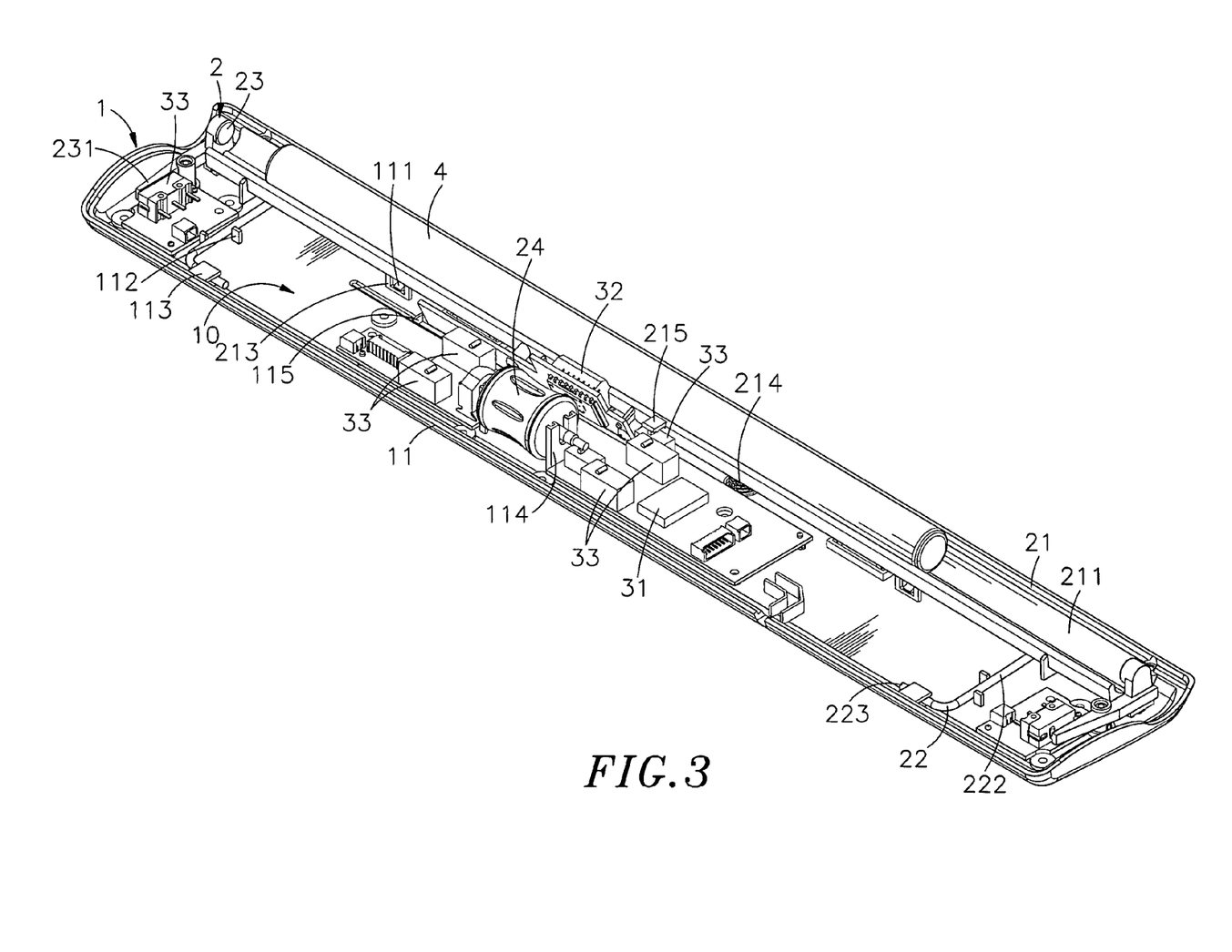
FIG. 3 is another elevational view of the cursor control device in accordance with the present invention after removal of the second holder shell and the wrist pad.
Figure 4:
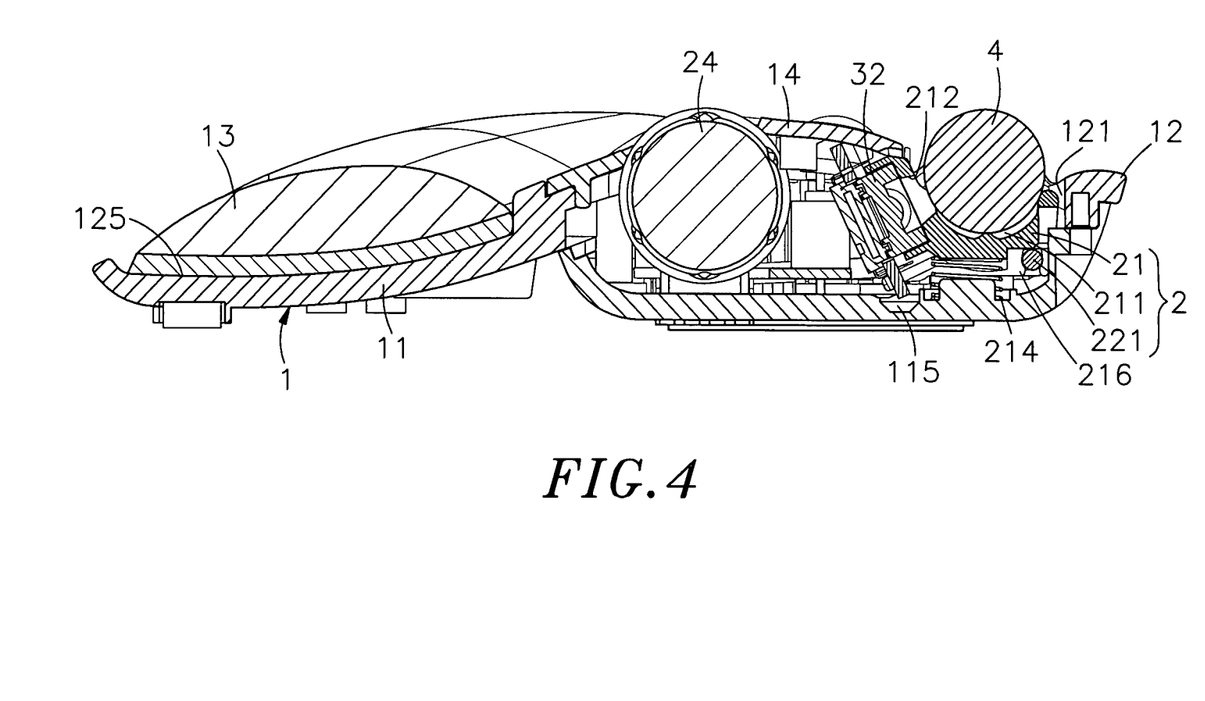
FIG. 4 is a sectional side view of the cursor control device in accordance with the present invention.
Figure 5:
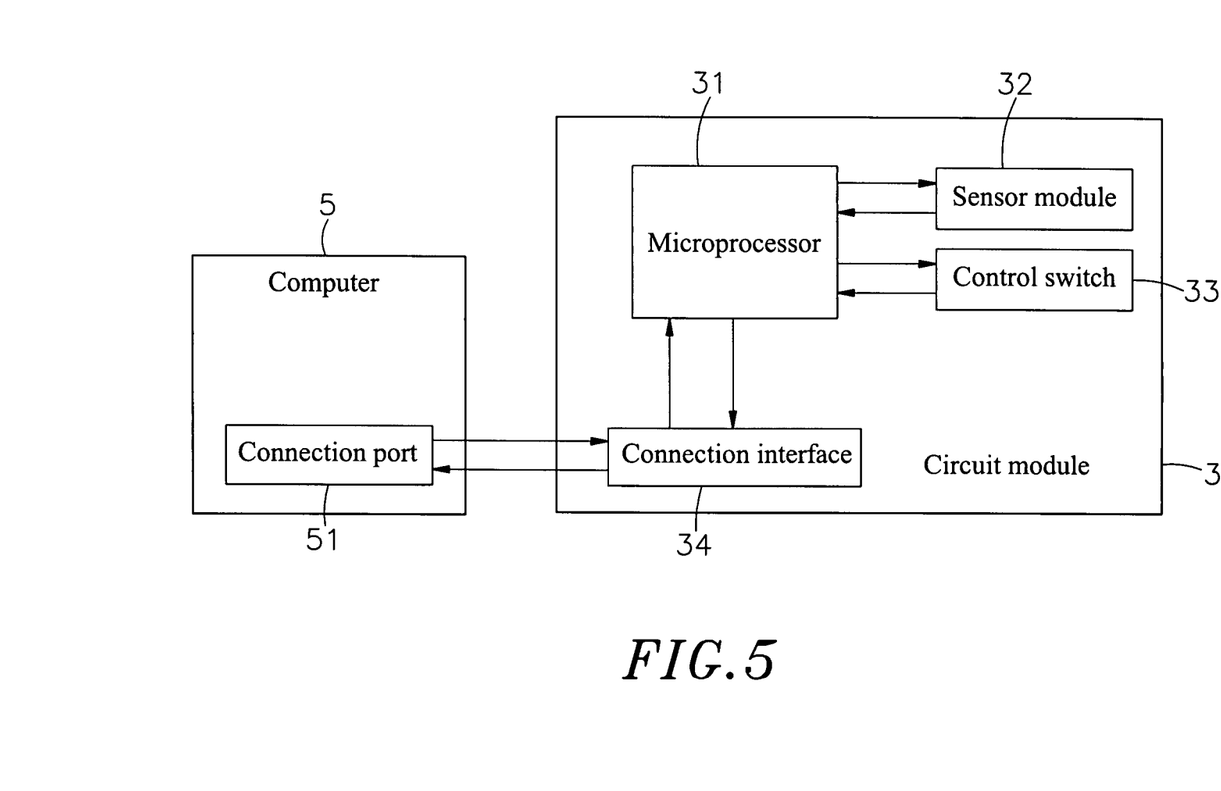
FIG. 5 is a block diagram of the cursor control device in accordance with the present invention.
Figure 6:
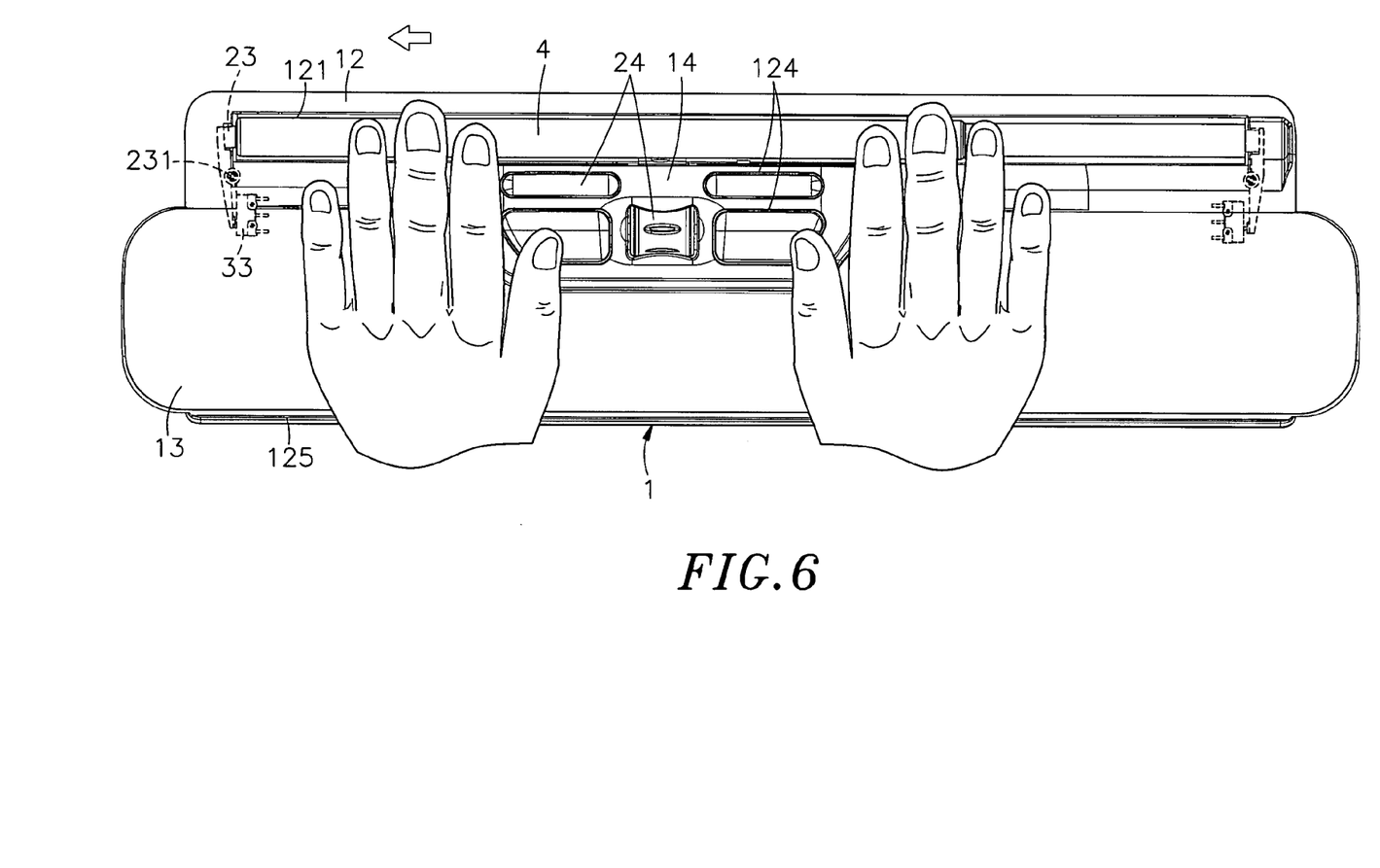
FIG. 6 is a schematic top view of the present invention, showing the rolling roll moved by the user.
Figure 7:
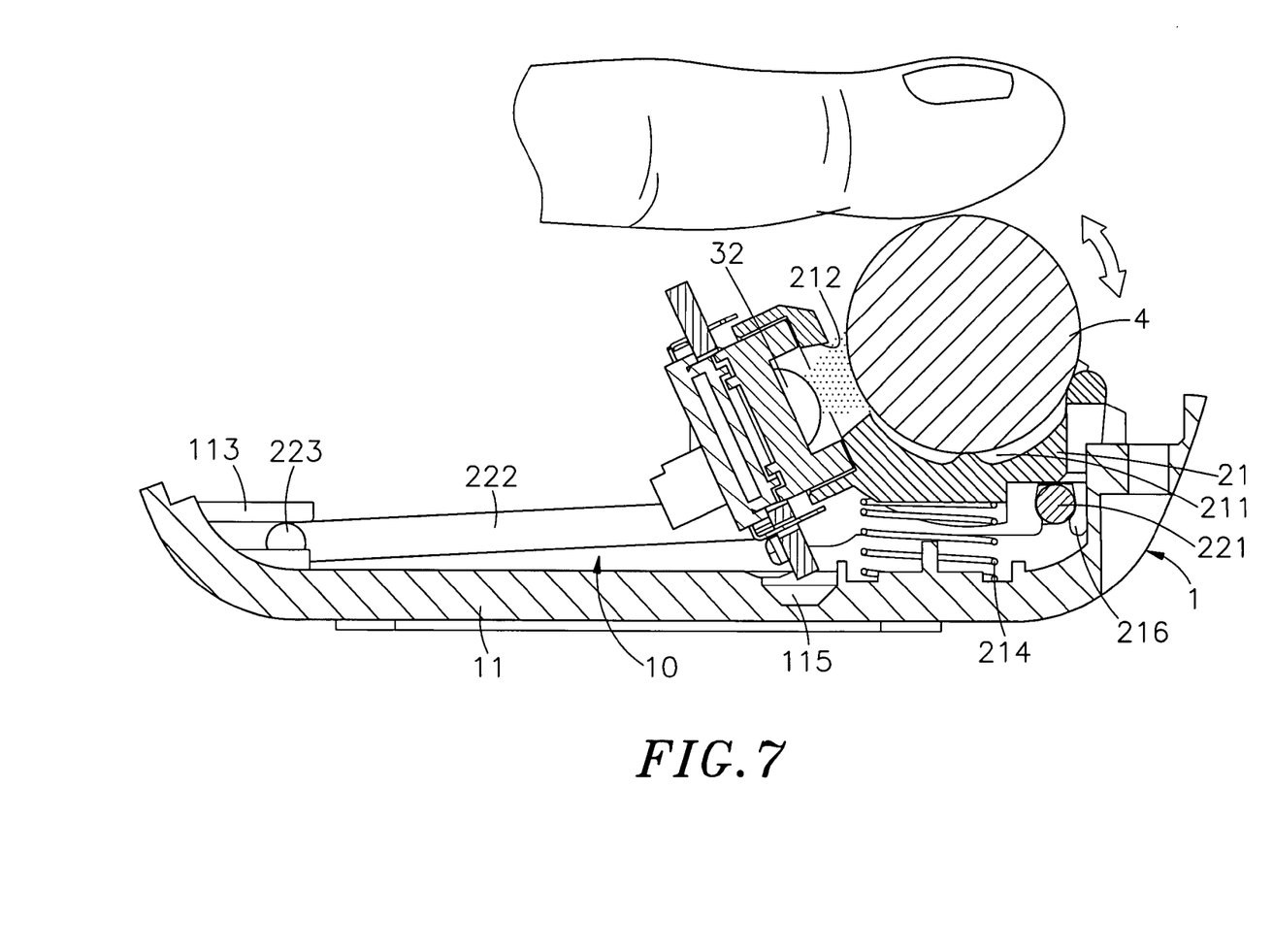
FIG. 7 is a schematic sectional side view of the present invention, showing the rolling roll rotated by the user.
Figure 8:
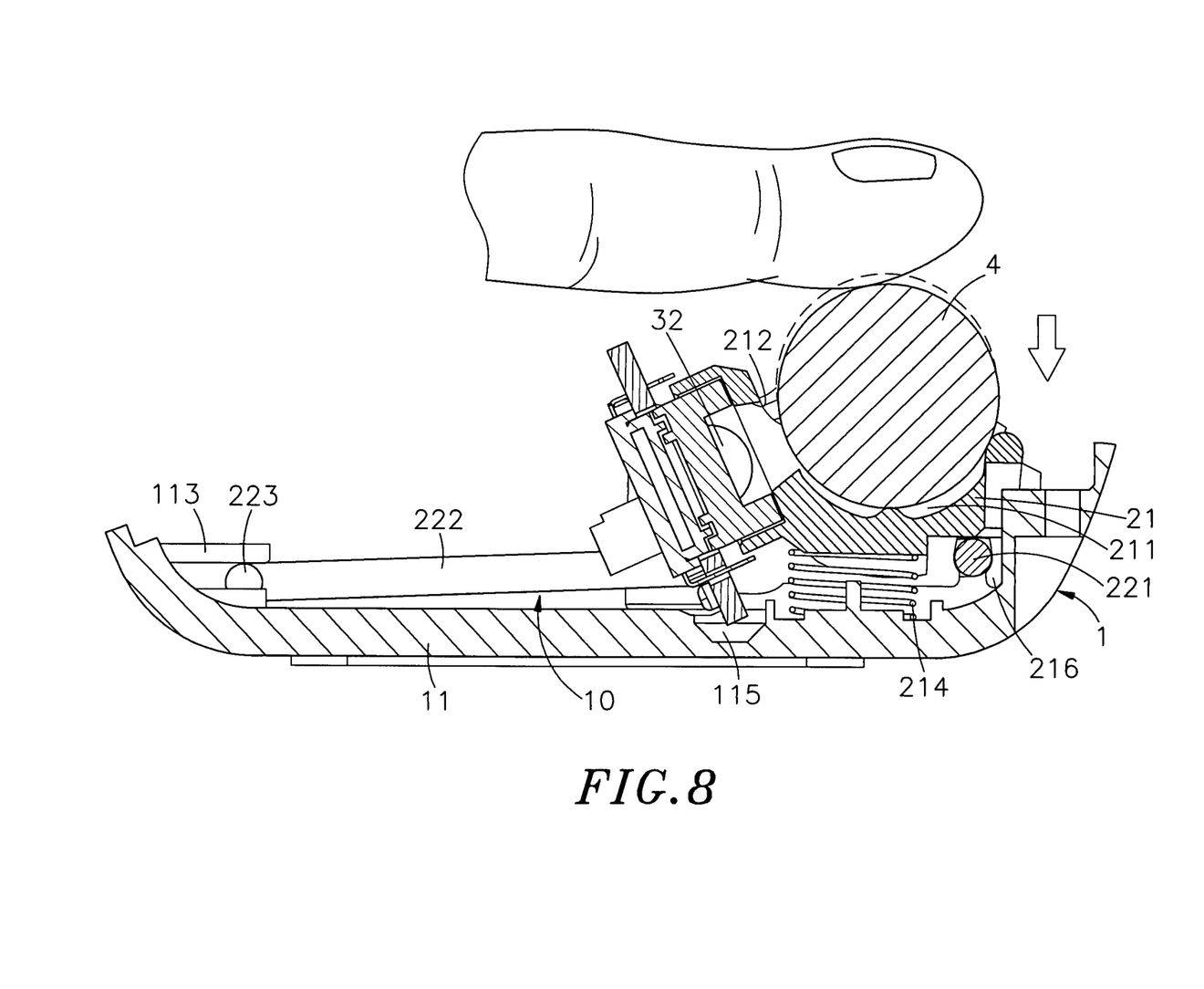
FIG. 8 is a schematic sectional side view of the present invention, showing the rolling roll pressed downwards by the user.

Referring to FIG. 8 and FIGS. 2 and 3, when using the cursor control device, the user can press the rolling roll 4 to lower the carrier frame 21 and to compress the elastic members 214. When lowering the carrier frame 21, the press member 215 will be forced to trigger the associating control switch 33 of the circuit module 3, thereby producing a trigger signal corresponding to the location of the cursor on the display screen of the computer. Further, as stated above, the sensor module 32 is mounted on the outside of the carrier frame 21 corresponding to the opening 212. When the carrier frame 21 is lowered, the sensor module 32 detects rotation of the rolling roll 4. By means of the operation of the sensor module 32 to detect vertical movement of the rolling roll 4 with the carrier frame 21 and rotation of the rolling roll 4 in the carrier frame 21 and triggering control of the control switches 33, the cursor control device effectively controls the cursor to grab a web page and to scroll up or down the web page or to click a menu selection. When the user releases the pressure from the rolling roll 4, the elastic members 214 immediately push the carrier frame 21, returning the carrier frame 21 to its former position.

Referring to FIG. 8 and FIGS. 2 and 3 again, as stated above, the sensor module 32 is mounted on the carrier frame 21 at one lateral side corresponding to the opening 212 but not at the bottom side. When the carrier frame 21 is lowered, the sensor module 32 enters the groove 115. Therefore, the accommodation space 10 that is defined in the module holder 1 below the carrier frame 21 can simply accommodate the position-limit blocks 213, the elastic members 214, the bottom support members 216 and the balance bar 22 and allow vertical movement of the carrier frame 21 relative to the module holder 1. Thus, the thickness of the module holder 1 can be minimized, providing a low profile characteristic. Further, the opening 212 that receives the sensor module 32 is located on the carrier frame 21 at one lateral side but not at the bottom side, outside dust will not enter the opening 212 easily, and therefore the sensor module 32 will not be covered with dust to interfere with the sensing operation, assuring a high level of sensing accuracy.

Further, as stated above, the rolling roll 4 is rotatably and axially slidably mounted in the rotation groove 211 of the carrier frame 21. If the downward force applied by the user's hand to the rolling roll 4 is at a location far from the midpoint of the rolling roll 4, the rolling roll 4 and the carrier frame 21 may be forced to tilt. At this time, due to the arrangement that the two end pins 223 of the balance bar 22 are respectively pivotally coupled to the pivot connectors 113 of the module holder 1, the balance bar 22 balances the tilting action of the rolling roll 4 and the carrier frame 21 for allowing the carrier frame 21 to be moved downwards in a balance manner. If the carrier frame 21 is made from a non-hard material (plastics or rubber), the balance bar 22 will support the carrier frame 21 in shape, keeping the carrier frame 21 straight and allowing rotation or axial displacement of the rolling roll 4 smoothly.

Referring to FIGS. 1, 2 and 3 again, the carrier frame 21 is set in the slot 121 of the module holder 1 to keep the rotation groove 211 out of the module holder 1. Further, the length of the rolling roll 4 is shorter than the rotation groove 211. Therefore, the user can pick up the rolling roll 4 from the rotation groove 211 directly with the hand. When the rolling roll 4 is covered with dust or contaminated with impurities after a long use, the user can remove the rolling roll 4 from the carrier frame 21 directly for cleaning. Further, this rolling roll mounting arrangement allows the user to replace the rolling roll 4 with another one having the same size but different weight subject to one's preference.

Figure 9:
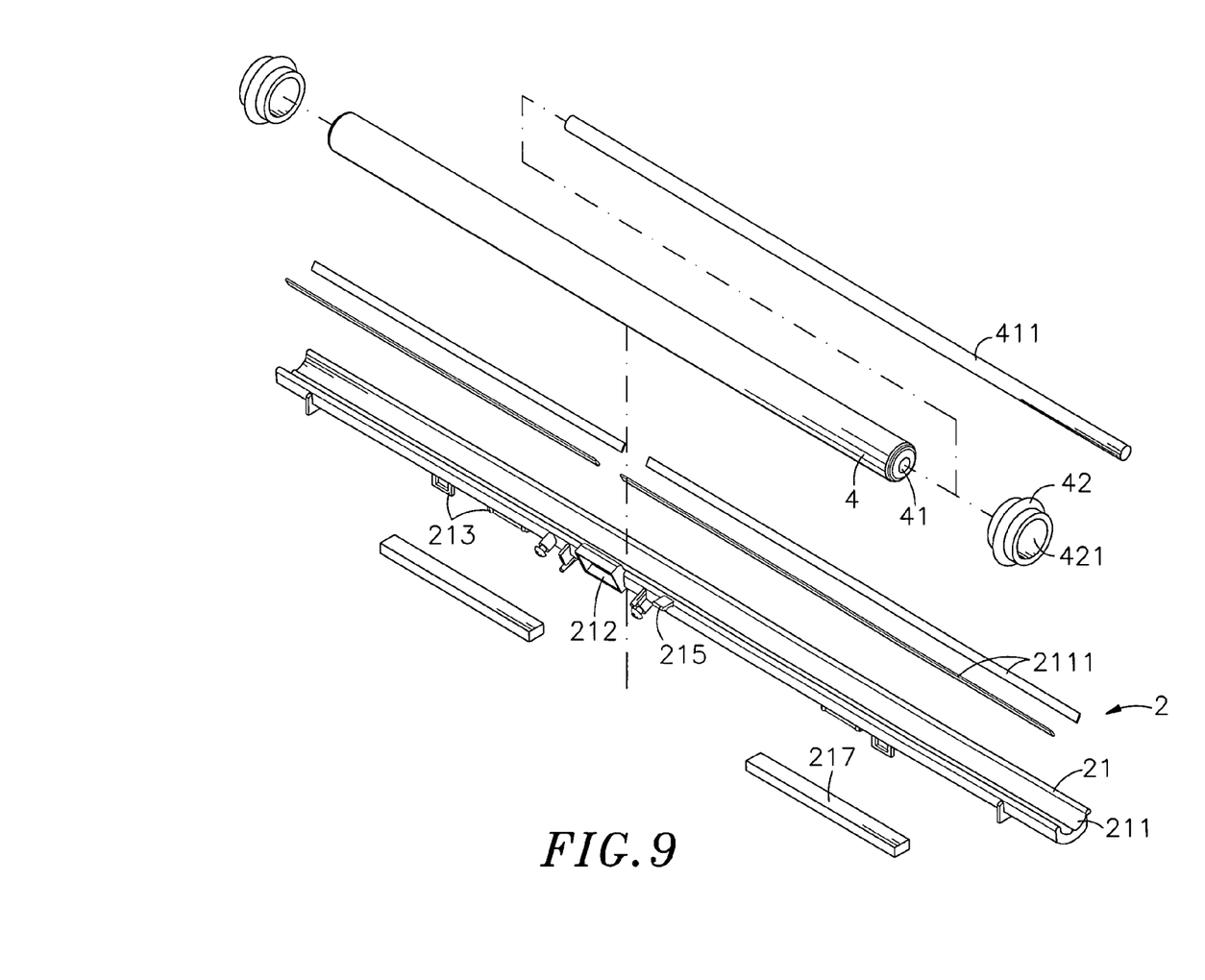
FIG. 9 is an exploded view of a part of the present invention, showing an alternate form of the arrangement of the carrier frame and the rolling roll.

Referring to FIG. 9 and FIGS. 2 and 3 again, the rolling roll 4 is rotatably and axially slidably accommodated in the rotation groove 211 of the carrier frame 21. In order to minimize friction between the surface of the rotation groove 211 and the rolling roll 4, the carrier frame 21 is preferably prepared from polyoxymethylene (POM), polytetrafluoroethylene (PTFE) or any of a variety of other suitable self-lubricating materials. Further, supplementary elements 2111 may be used to facilitate rotation of the rolling roll 4 in the rotation groove 211. The supplementary elements 2111 can be rod-like or strip-like elements prepared from ultra-high molecular weight polyethylene (UPE) or polytetrafluoroethylene (PTFE), or spherical supplementary elements prepared from ruby, ceramic or any of a variety of other wear resistant materials.

Further, the rolling roll 4 can be a solid roll. Alternatively, as shown in FIG. 9, the rolling roll 4 can be a tubular roll having an axial through hole 41 extending through the two distal ends thereof. Weights may be selectively fastened to the axial through hole 41 to change the total weight of the rolling roll 4 as desired. Further, a magnetically permeable core member 411 may be fitted into the axial through hole 41 of the rolling roll 4. Further, magnetic members 217 may be affixed to the carrier frame 21 to attract the magnetically permeable core member 411 in the axial through hole 41 of the rolling roll 4, securing the rolling roll 4 to the carrier frame 21 and avoiding falling of the rolling roll 4 out of the carrier frame 21 accidentally due to an excessive amount of applied force during operation of the cursor control device.

Further, sliding rings 42 may be respectively coupled to the two distal ends of the rolling roll 4 to support the rolling roll 4 in the rotation groove 211 of the carrier frame 21, allowing rotation of the rolling roll 4 in the rotation groove 211 of the carrier frame 21 smoothly. The sliding rings 42 can be prepared from ultra-high molecular weight polyethylene (UPE) or polytetrafluoroethylene (PTFE). Further, axle bearings 421 are set in between the sliding rings 42 and the rolling roll 4. The use of the sliding rings 42 reduces the contact area between the rolling roll 4 and the carrier frame 21, and therefore less friction will be produced during rotation of the rolling roll 4 in the rotation groove 211. Further, if the sliding rings 42 cannot be rotated with the rolling roll 4 in the rotation groove 211 smoothly when the user is operating the rolling roll 4, the axle bearings 421 facilitates rotation of the rolling roll 4 relative to the carrier frame 21.

Referring to FIGS. 2, 3 and 9 again, the operation members are respectively mounted in the module holder 1 and respectively partially exposed to the outside of the module holder 1 through the insertion holes 124 on the second holder shell 12 for operation by the user. The operation members 24 can be buttons, rolling wheels, rolling balls, or any other manually operation members operable by the user to trigger the respective control switches 33 or the circuit module 3 for controlling cursor movements and button clicks on a screen menu.

As stated above, the invention provides a cursor control device, which has the following advantages and features:

1. The carrier frame 21 defines a rotation groove 211 for receiving the rolling roll 4. The rolling roll 4 has a length shorter than the length of the rotation groove 211. Therefore, when the rolling roll 4 is covered with dust or when the user wishes to adjust the weight of the rolling roll 4, the user can take the rolling roll 4 out of the carrier frame 21 directly with the hand.
2. The sensor module 32 of the circuit module 3 is mounted on the outside 2 of the carrier frame 21 at one lateral side corresponding to the opening 21 for detecting the direction and amount of movement of the rolling roll 4 in the rotation groove 211 of the carrier frame 21. It simply needs to provide a space below the carrier frame 21 for allowing vertical movement of the carrier frame 21 and for accommodating the balance bar 22. Therefore, the vertical height of the cursor control device can be minimized and, outside dust will not enter the opening 212 to cover the sensor module 32, assuring a high level of sensing accuracy.
3. The balance bar 22 is pivotally supported on the bottom support members 216 of the carrier frame 21 with the two end pins 223 thereof respectively pivotally coupled to the pivot connectors 113 of the module holder 1. Therefore, the balance bar 22 keeps the rolling roll 4 and the carrier frame 21 in balance for allowing the carrier frame 21 to be moved downwards smoothly. If the carrier frame 21 is made from a non-hard material (plastics or rubber), the balance bar 22 will support the carrier frame 21 in shape, keeping the carrier frame 21 straight and allowing rotation or axial displacement of the rolling roll 4 smoothly.
4. The carrier frame 21 and the module holder 1 are relatively longer than the rolling roll 4. Thus, the user can rest the hands on the wrist pad 13 at selected locations subject to personal preference, assuring a high level of operation comfort.
5. The carrier frame 21 can be prepared from POM, PTFE or any other self-lubricating material to reduce friction. Further, supplementary elements 2111 may be used to facilitate rotation of the rolling roll 4 in the rotation groove 211.

6. The rolling roll 4 can be a solid roll. Alternatively, the rolling roll 4 can be a tubular roll having an axial through hole 41 extending through the two distal ends thereof for accommodating weights to adjust the total weight of the rolling roll 4. Further, a magnetically permeable core member 411 may be fitted into the axial through hole 41 of the rolling roll 4. Further, magnetic members 217 may be affixed to the carrier frame 21 to attract the magnetically permeable core member 411 in the axial through hole 41 of the rolling roll 4, securing the rolling roll 4 to the carrier frame 21 and avoiding falling of the rolling roll 4 out of the carrier frame 21 accidentally due to an excessive amount of applied force during operation of the cursor control device.

In general, the cursor control device comprises a module holder 1 defining an accommodation space 10 and a slot 121, an operation module 2 with a carrier frame 21 that is mounted in the slot 121 and inserted into the accommodation space 10 and has a rotation groove 211 disposed outside the accommodation space 10 and an opening 212 disposed adjacent to the slot 121 and in communication with the accommodation space 10, a rolling roll 4 rotatably and axially slidably mounted in the rotation groove 211 for operation by the user, and a circuit module 3 having a sensor module 32 mounted on the carrier frame 21 corresponding to the opening 212 for detecting the direction and amount of movement of the rolling roll 4. The rolling roll 4 can be directly removed from the carrier frame 21 by the user for cleaning or for a replacement.

A prototype of cursor control device has been constructed with the features of FIGS. 1~9. The control device functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cursor control device adapted for controlling a cursor on a display screen of a computer, comprising:
a module holder, said module holder defining an accommodation space therein and a slot in communication with said accommodation space;
an operation module, said operation module comprising a carrier frame mounted in said accommodation space and inserted through said slot, said carrier frame having a rotation groove disposed outside said module holder and an opening located on one lateral side thereof in communication with said accommodation space, and said carrier frame being movable vertically to a lowered position in response to an external force;
a rolling roll accommodated in said rotation groove and rotatable and axially movable relative to said carrier frame, said rolling roll having a length shorter than the length of said rotation groove, and said rolling roll being movable vertically with said carrier frame to said lowered position and meanwhile being rotatable and axially movable relative to said carrier frame; and
a circuit module, said circuit module comprising a microprocessor, a sensor module mounted in said opening of said carrier frame outside said rotation groove and electrically connected with said microprocessor and adapted for detecting the direction and amount of movement of said rolling roll, said sensor module being movable vertically with said carrier frame so as to detect the direction and amount of movement of said rolling roll in said lowered position.

2. The cursor control device as claimed in claim 1, wherein said module holder is formed of a plurality of shells.

3. The cursor control device as claimed in claim 1, wherein said module holder comprises a plurality of limiters;
said carrier frame comprises a plurality of position-limit blocks respectively coupled to said limiters for allowing vertical movement of said carrier frame relative to said module holder within a predetermined distance.

4. The cursor control device as claimed in claim 1, wherein said operation module further comprises a balance bar, said balance bar having a fixed end pivotally to said module holder at a bottom side in said accommodation space and a free end extending to said slot and stopped against said carrier frame.

5. The cursor control device as claimed in claim 4, wherein said module holder further comprises a plurality of locating members, and a plurality of pivot connectors disposed at one lateral side remote from said slot;
said balance bar has an elongated base portion pivotally coupled to said carrier frame, two arm portions respectively perpendicularly extended from two distal ends of said elongated base portion and respectively coupled to said locating members and two end pins respectively perpendicularly extended from said arm portions remote from said elongated base portion and respectively pivotally coupled to said pivot connectors of said module holder.

6. The cursor control device as claimed in claim 5, wherein said carrier frame further comprises a plurality of bottom support members;
said elongated base portion of said balance bar is pivotally coupled to said bottom support members.

7. The cursor control device as claimed in claim 1, wherein said module holder further has a plurality of insertion holes disposed in communication with said accommodation space;
said circuit module further comprises a plurality of control switches respectively electrically connected to said microprocessor;
said operation module further comprises a plurality of operation members mounted in said accommodation space and partially extending out of said module holder through said insertion holes for operation by a user to trigger said control switches respectively.

8. The cursor control device as claimed in claim 7, wherein said module holder further comprises a plurality of pivot supports respectively disposed corresponding to said insertion holes for pivotally supporting said operation members.

9. The cursor control device as claimed in claim 7, wherein said module holder has a bearing flange extended from one side of said insertion holes opposite to said slot for the resting of the user's hands.

10. The cursor control device as claimed in claim 9, wherein said bearing flange is covered with an elastic wrist pad.

11. The cursor control device as claimed in claim 7, wherein said module holder has an ornamental plate covered thereon around said insertion holes.

12. The cursor control device as claimed in claim 1, wherein said module holder has a groove disposed in a bottom side of said accommodation space for receiving said sensor module in said lowered position.

13. The cursor control device as claimed in claim 1, wherein said module holder has a plurality of coupling holes disposed in communication with said accommodation space at two sides relative to said slot;

said circuit module further comprises a plurality of control switches respectively electrically connected to said microprocessor;

said operation module further comprises a plurality of knobs respectively coupled to said coupling holes of said module holder for rotation by said rolling roll to trigger said control switches, each said knob having a pivot pin pivotally connected to said module holder.

14. The cursor control device as claimed in claim 1, wherein said operation module further comprises a plurality of supplementary elements mounted in said rotation groove of said carrier frame to facilitate rotation of said rolling roll in said rotation groove, said supplementary elements being prepared from the material group consisting of ultra-high molecular weight polyethylene (UPE), polytetrafluoroethylene (PTFE), ruby and ceramic.

15. The cursor control device as claimed in claim 1, wherein said carrier frame has elastic members mounted on a bottom side thereof opposite to said rotation groove.

16. The cursor control device as claimed in claim 1, wherein said circuit module further comprises at least one control switch electrically connected to said microprocessor;

said operation module further comprises at least one press member mounted on said carrier frame outside said rotation groove for pressing by a user to trigger said at least one control switch.

17. The cursor control device as claimed in claim 1, wherein said rolling roll has an axial through hole for accommodating at least one weight.

18. The cursor control device as claimed in claim 1, wherein said rolling roll has an axial through hole and a magnetically permeable member fitted into said axial through hole;

said operation module further comprises a plurality of magnetic members affixed to said carrier frame and adapted for attracting said magnetically permeable member to secure said rolling roll to said rotation groove.

19. The cursor control device as claimed in claim 1, further comprising two sliding rings respectively mounted on two distal ends of said rolling roll to reduce friction between said rolling roll and said carrier frame during movement of said rolling roll relative to said carrier frame, said sliding rings being prepared from a material group consisting of ultra-high molecular weight polyethylene (UPE) and polytetrafluoroethylene (PTFE).

20. The cursor control device as claimed in claim 19, further comprising two axle bearings respectively mounted in between said rolling roll and said sliding rings.

21. The cursor control device as claimed in claim 1, wherein said circuit module further comprises a connection interface electrically connecting said microprocessor to a connection port of said computer, said connection interface being selected from one of a USB connector and a PS2 connector.

22. The cursor control device as claimed in claim 1, wherein said carrier frame is prepared from a material group consisting of polyoxymethylene (POM), polytetrafluoroethylene (PTFE) and self-lubricating materials.

23. The cursor control device as claimed in claim 1, wherein said carrier frame has an opening disposed at one lateral side adjacent to said slot of said module holder.

* * * * *